United States Patent
Boyer et al.

(10) Patent No.: US 7,250,142 B2
(45) Date of Patent: Jul. 31, 2007

(54) DEVICE FOR MIXING AND DISTRIBUTING A DENSE FLUID AND A LIGHT FLUID, PLACED UPSTREAM FROM A GRANULAR BED, AND ITS USE IN DESCENDING FLOW

(75) Inventors: Christophe Boyer, Charly (FR); Vincent Coupard, Vaulx en Velin (FR)

(73) Assignee: Institut Francois du Petrole, Rueil-Malmaison Cedex (FR)

( * ) Notice: Subject to any disclaimer, the term of this patent is extended or adjusted under 35 U.S.C. 154(b) by 597 days.

(21) Appl. No.: 10/619,557

(22) Filed: Jul. 16, 2003

(65) Prior Publication Data
US 2004/0086435 A1    May 6, 2004

(30) Foreign Application Priority Data
Jul. 16, 2002    (FR) .................... 02/09076

(51) Int. Cl.
*B01J 8/04* (2006.01)
*C10G 45/00* (2006.01)
*B01F 3/04* (2006.01)

(52) U.S. Cl. ............... 422/195; 422/196; 422/197; 422/215; 422/220; 208/210; 208/211; 261/96

(58) Field of Classification Search ............... 422/195, 422/196, 197, 215, 220; 208/210, 211; 261/96
See application file for complete search history.

(56) References Cited

U.S. PATENT DOCUMENTS

| | | | | |
|---|---|---|---|---|
| 3,977,834 A | * | 8/1976 | Alcock et al. | 422/191 |
| 4,839,108 A | * | 6/1989 | Silvey | 261/97 |
| 4,894,205 A | * | 1/1990 | Westerman et al. | 422/197 |
| 5,799,877 A | * | 9/1998 | Gupta et al. | 239/8 |
| 5,837,208 A | * | 11/1998 | Grott et al. | 422/195 |
| 5,869,541 A | * | 2/1999 | Euzen et al. | 518/700 |
| 6,017,443 A | * | 1/2000 | Buchanan | 208/210 |
| 6,554,994 B1 | * | 4/2003 | Reynolds et al. | 208/211 |
| 6,613,219 B2 | * | 9/2003 | Harter et al. | 208/146 |
| 6,824,675 B2 | * | 11/2004 | Boyer et al. | 208/146 |
| 2002/0020359 A1 | * | 2/2002 | Boyer et al. | 118/726 |
| 2002/0021991 A1 | * | 2/2002 | Boyer et al. | 422/195 |
| 2004/0028579 A1 | * | 2/2004 | Van Der Meer et al. | 422/194 |
| 2005/0062178 A1 | * | 3/2005 | Harter et al. | 261/96 |

* cited by examiner

*Primary Examiner*—N. Bhat (57) ABSTRACT

Device for mixing and distributing a dense, generally liquid, fluid and a light, generally gaseous, fluid, placed in a reaction chamber upstream from a granular bed (70) or between two successive granular beds, the said device being characterized by a tubular system (50) for the introduction of dense fluid from outside the reactor, up to a level lower than the level of establishment of the interface between the dense fluid and the light fluid, situated above the plate and preferably more or less next to that of the plate (62). Application of this device to any type of gas/liquid reaction in a fixed bed in particular for hydrotreatment.

27 Claims, 5 Drawing Sheets

DEVICE FOR MIXING AND DISTRIBUTING A DENSE FLUID AND A LIGHT FLUID, PLACED UPSTREAM FROM A GRANULAR BED, AND ITS USE IN DESCENDING FLOW

The present invention relates to a device permitting optimization of the mixing and distribution of two fluids the first of which is constituted by an essentially gaseous phase most often comprising hydrogen at least in part, and the second by an essentially liquid phase comprised of hydrocarbons, the said device being placed upstream from a granular bed or between two successive granular beds. By granular beds is meant an assembly of solid particles having the form of grains, these grains being able to have any shape but most often approximately cylindrical or spherical, and having typical dimensions of the order of some millimetres. These granular solids advantageously have a catalytic activity. Preferably, the mixing and distribution device of the present invention is integrated in a reactor able to contain one or more successive fixed granular beds separated from one another, in which the flow of the liquid and gaseous phases is in descending co-current through the said fixed bed or beds of granular solids.

In the remainder of the present description, reference will be made without distinction to mixing and distribution systems or devices. These systems can be placed generally upstream from a granular bed, between two successive granular beds, and generally at the top of a reactor fed by at least two fluids of different physical state, generally a liquid and a gas.

The invention described in the present application applies to reactors for which the fluxes of liquid to be distributed are generally between 0.5 and 100 kg/m$^2$/s and more usually between 10 and 80 kg/m$^2$/s.

The present invention finds an application in particular in all cases where the gaseous phase is in the minority compared with the liquid phase, that is to say where the volume ratio between the gas and the liquid is less than 1, but it can also be used when the gaseous phase is greatly in the majority compared with the liquid phase, that is to say when the volume ratio between the gas and the liquid is often greater than 3/1 and usually less than 400/1. The field of the invention thus covers volume ratios between the gas and liquid of between 0 and 400, excluding 0.

The invention also applies in the cases where the reaction is strongly exothermic and requires the introduction into the reactor of a supplementary fluid, most often gaseous, in order to cool the gas/liquid mixture.

The present invention also applies to the case where the reaction requires a close contact in order to permit the dissolution of a compound that is most often gaseous, for example hydrogen $H_2$, in the liquid phase. The present invention applies in particular in the field of gas/liquid distributors, such as for example those used for the carrying out of hydrotreatment reactions, for example hydrocracking, hydrodesulphurization, hydrodenitrification, selective or total hydrogenations of the $C_2$ to $C_5$ fractions. The invention also applies to the cases of the selective hydrogenation of steam-cracking gasolines, the hydrogenation of the aromatic compounds in aliphatic and/or naphthenic fractions, and the hydrogenation of olefins in aromatic fractions.

It also finds application for the carrying out of other reactions requiring a good mixing of a gaseous phase and a liquid phase, for example partial or total oxidation reactions, amination, acetyloxidation, ammoxidation and halogenation in particular chlorination reactions.

In the specific field of hydrodesulphurization, hydrodenitrification, hydrocracking reactions and particularly when it is desired to achieve strong conversions in order to obtain a product containing for example less than 30 ppm (parts per million) of sulphur, it is necessary to have a good distribution of the gas and of the liquid, but principally of the liquid, in the knowledge that gas-to-liquid volume ratios which vary generally from roughly 3/1 to roughly 400/1, and most often from roughly 10/1 to roughly 200/1, are concerned. This is also the case when using an auxiliary cooling fluid, called quench in Anglo-Saxon terminology, where a very good contact between this auxiliary fluid introduced in order to effect the cooling, and the fluids of the process, often called process fluids, is necessary.

BACKGROUND OF THE INVENTION

The problem of the optimization of the distribution of a fluid comprised of at least one gaseous phase and at least one liquid phase is already the subject of several solutions which are examined below:

Patent FR 2 745 202 and patent U.S. Pat. No. 5,688,445 thus propose a plate with pipes which are fitted with holes arranged in tiers along the pipe for the passage of the gas (upper holes) and of the liquid (lower holes). No system is provided in this prior art to prevent the fluctuations of the liquid/gas interface above the plate that are due to the injection of the liquid at the top of the reactor. In fact, because of their configuration, any imbalance in this interface necessarily means an imbalance of the gas and liquid fluxes from one pipe to the other, which is clearly harmful to the homogeneity of the mixture.

Patent WO 95/35159 proposes a distribution system on two levels. The first level is comprised of a circular plate with raised edges that is intended to dampen the impact of the gas/liquid flow entering the reactor. The liquid then flows from this first plate towards the distributor plate through tubes the base of which contains slots. These tubes are not under liquid load and a certain quantity of gas can thus flow mixed with the liquid. This first plate must calm the oscillations of the liquid level on the second plate or distributor plate, but the entrainment of the gas at the descent tubes can produce foaming at the liquid guard of the distributor plate and thus degrade the feed of the distribution pipes. The second level is comprised of a plate with pipes that are pierced by holes partly situated above the plate and partly situated below the plate. The drawback of this plate is that the flexibility vis-à-vis the liquid flow rate is achieved using two types of pipes. Depending on the liquid flow rate, the density of the injection points is thus variable. In addition, the introduction of two levels imposes a substantial height at the top of the reactor.

U.S. Pat. No. 4,140,625 proposes a system of plates crossed by venturi flumes. The gas is injected at the top of these flumes and the liquid is injected at the neck or upstream from the convergent zone of the venturi. The gas/liquid mixture is then injected into the catalytic bed. This system has the drawback of offering only a small flexibility as regards liquid flow rate since there is only one level of holes for the liquid.

U.S. Pat. No. 5,799,877 proposes a distributor plate system in which the gas and the liquid are injected through concentric tubes, the tube for injecting the gas being situated in the centre. To guarantee a broad operating range in terms of liquid flow rate, the height of the tubes for the introduction of the liquid is variable according to the injection points.

This invention thus has the drawback of proposing a density of points for the injection of the liquid that is variable according to the liquid flow rate. In particular, the smallest liquid flow rates, the very ones which are most difficult to distribute well, benefit from the smallest number of injection points. Secondly, no system is provided to dampen the fluctuations of the liquid level above the plate that would be due to the impact of the gas/liquid flow on entering the reactor.

To summarize, among the systems proposed in these various patents and using a plate with mixed injection of the liquid and gas phases, either the plate offers a great flexibility as regards liquid flow rate but has no means of stabilizing the gas/liquid interface upstream from the plate, or the plate has two levels in order to dampen the fluctuations of the gas/liquid interface, but offers only a small flexibility as regards liquid flow rate.

SUMMARY OF THE INVENTION

The subject of the present invention is a device making it possible to carry out the mixing of two fluids, one gaseous and light and the other liquid and dense, and the most homogeneous possible distribution of this mixture over the whole of the section of the reactor upstream from a bed of granular solid. The device comprises a substantially horizontal plate, covering all of the section of the reaction chamber and supporting a multiplicity of more or less vertical pipes that are of advantageously constant section, including an upper end communicating with the part of the reactor situated above the plate, a lower end communicating with the part of the reactor situated below the plate, the said pipes being pierced by lateral orifices permitting the introduction of the dense fluid and of some of the light fluid inside the said pipes, and the said device being characterized by a tubular system for the introduction of the dense fluid from outside the reactor up to a level between the plate and that of at least one lateral orifice of the pipes in contact with the dense fluid, the tubular system having exit slots for the dense fluid that are wholly immersed in the said volume surmounting the plate.

The first fluid, the less dense, is injected by the entrance of the reactor upstream from the plate. The second fluid, the denser, can be injected via a tubular system comprising a more or less vertical principal tube advantageously supplemented by a multiplicity of more or less horizontal secondary tubes described below, this tubular system including a multiplicity of orifices discharging preferably at a level situated slightly above the level of the plate supporting the pipes, and this level being wholly immersed in the volume of this second fluid surmounting the plate. As the two fluids are injected separately upstream from the plate, a plane interface forms between the volume of the second fluid resting on the plate supporting the pipes, and the volume of the first fluid which occupies the space left free between the upper part of the second fluid and the upper part of the reactor. The system described in this invention allows this interface, between the volume of the second fluid and the volume of the first fluid, to be kept plane and horizontal so as to control a homogeneous feed to the different perforated pipes, by each of the two fluids. More precisely, the greater part of the first fluid is introduced into the pipes by orifices situated at the upper end of the said pipes and by a first part of the lateral orifices arranged at several levels along the pipes, and the second fluid is introduced by a second part of these lateral orifices situated below the first part. This system allows the formation bubble or foaming phenomena, which may appear in the volume of dense fluid and disturb the feed to the pipes, to be avoided. More precisely, the present device makes it possible to guarantee that the feeding of the pipes by the dense fluid indeed takes place with this dense fluid in a homogeneous physical state and identical from one pipe to the next, and not in a state aerated to a greater or lesser extent by the presence of part of the light fluid in the dense fluid in the form of an emulsion or very fine bubbles, as is possible when the interface between the two fluids is disturbed.

According to a preferred embodiment, the liquid and gaseous phases can circulate in descending co-current flow through the said bed or beds of granular solids.

The density of the pipes expressed as the number of pipes per $m^2$ of reactor section will generally be between 100 and 700 per $m^2$ and preferably between 150 and 500 per $m^2$.

According to a preferred characteristic of the invention the lateral orifices will be distributed along the pipes over at least two levels, the lowest level being situated at a distance of between 100 and 300 mm relative to the level where the tubular system discharges, and the successive levels being spaced at least 20 mm apart from each other.

According to another characteristic of the invention, the pipes can be extended below the level of the plate by a distance (h), this distance (h) preferably being between 10 and 100 mm.

According to another characteristic of the invention, the distance (d) separating the lower end of the pipes from the upper level of the bed will be between 0 and 50 mm, excluding 0, and preferably between 0 and 20 mm, excluding 0.

Advantageously, a buffer drum outside the reactor, linked to the present device by lines and permitting the exchange of material between the liquid phase and the gaseous phase, can be positioned upstream from the top of the reactor, the said lines permitting the separate injection into the reactor of an essentially liquid phase optionally containing dissolved gas and an essentially gaseous phase, the said essentially liquid and essentially gaseous phases resulting from the prior bringing into contact of liquid and gaseous phases in the said buffer drum.

By essentially gaseous phase is meant a phase containing at least 50% gas, preferably at least 70% gas, and even more preferably at least 90% gas. By essentially liquid phase is meant a phase containing at least 50% liquid, preferably at least 70% liquid, and even more preferably at least 90% liquid.

Thus, the present invention permits a great flexibility as regards the liquid flow rate, and guarantees the absence of fluctuations of the level of the gas/liquid interface.

In certain cases, the arrival of the phases and their introduction into the reactor can be carried out in the mixed state. In order that the invention can nevertheless be put into practice, it is then necessary to provide, at the top of the reactor, a system for separating this mixed phase so as to have available, at the exit from the said separation system, an essentially gaseous phase and an essentially liquid phase as defined a little earlier. This separation system is an integral part of the present invention when the gaseous and liquid phases are introduced in a mixture into the reactor.

Further non-limiting examples of the hydrotreatment reactions in which the invention is useful include hydrodesulfuration of middle distillates cuts. These cuts include Kerosene, with an ASTM distillation range of about [165° C.–240° C.], gasoil or diesel cuts with an ASTM distillation range of about [200° C.–370° C.], and generally any middle distillate cut with more than 80% weight boiling in the ASTM distillation range of [165° C.–370° C.]. The sulfur level of these cuts may vary, for example, between 1000 ppm and 3% weight sulfur, and can be reduced by hydrotreatment down to less than 50 ppm weight, or less than 30 ppm weight, or even less than 10 ppm weight.

Further non-limiting examples of the selective hydrogenation reactions in which the invention is useful include hydrocarbon cuts:

- cuts (typically C2 cuts) comprising acetylene (C2H2), that is converted into ethylene (C2H4),
- cuts (typically C3 cuts) comprising propadiene (C3H4) and/or propyne (C3H4), that are converted into propylene (C3H6),
- cuts (typically C4 cuts) comprising butadiene (C4H6) and/or butyne (C4H6) and/or vinylacetylene (C4H6), that are converted into butylenes (C4H8),
- cuts (typically C5 or gasoline cuts) comprising pentadiene (C5H8) and/or cyclopentadiene (C5H6), that are converted into pentene (C5H10) and/or methylbutene (C5H10) and/or cyclopentene (C5H8).

The concentration of the species in the selective hydrogenation feeds may vary widely, typically between 10 ppm weight and 20% weight, or even up to 65% weight in the case of feeds comprising butadiene and/or unsaturated C5 hydrocarbons. The cuts comprising C4 and/or C5 hydrocarbons can also be deeply hydrogenated, respectively into butane (C4H10) and/or pentane (C5H12).

Other advantages and characteristics of the invention will appear more clearly upon reading of the description given below by way of an embodiment.

BRIEF DESCRIPTION OF THE DRAWINGS

Various features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
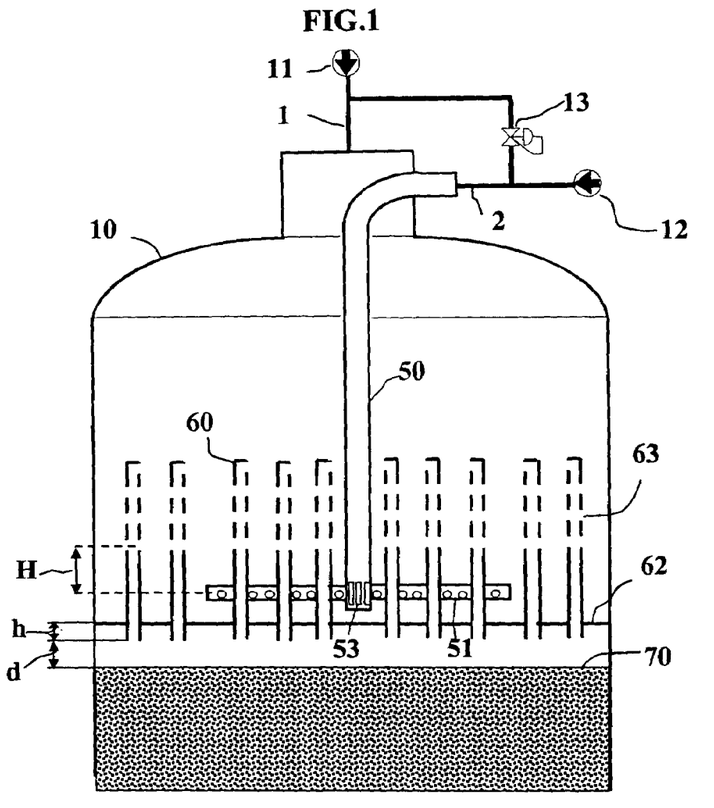
FIGS. 1 and 2 show in schematic form an embodiment of the mixing and distribution system when this is placed at the top of a first granular bed of the reactor and when the fluids to be mixed can be introduced separately into the reactor.

The reactor shown schematically in FIG. 1 is an elongated fixed-bed reactor (10) containing one or more successive beds, which operates in descending co-current gas/liquid flow. A liquid charge (12) is injected close to the top of the reactor, through a line (2), into at least one tube (50) which will also be called tubular system.

A gaseous charge (11) is injected at one more levels of the reactor (10), at least one of these levels being situated at the top of the reactor. The gaseous charge is injected at the top of the reactor by a line (1). If there is a rise in the pressure of the tubular system (50) or of the line (2), a pressure compensation system (13) comprised of a regulator valve controlled by a differential pressure sensor permits evacuation of some of the liquid flow to the line (1).

A more or less horizontal plate (62) covering all of the section of the reactor is adherent to the wall of the said reactor and supports a plurality of pipes (60) open at their upper end and presenting, along their lateral wall, a series of passage orifices (63) that are either more or less circular in shape or elongated. These pipes are more or less parallel to the axis of the reactor.

The liquid is advantageously injected closest to the plate with the help of at least one more or less vertical tube (50) optionally fitted with exit slots (53) for the said fluid, these slots being positioned on the periphery in the lower part of the tube (50). The slots of the tube are wholly immersed in the volume of liquid above the plate defined by the plate and a level of the orifices for lateral passage of the liquid, these orifices preferably being wholly immersed. The tube (50) can also be extended by a series of more or less horizontal tubes (51) fitted with exit orifices for the liquid (54). The tube (50) is connected to the line (2) for the injection of the liquid after having crossed the wall of the reactor (10).

The level at which the perforated tubes (51) or the peripheral slots (53) of the tube (50) are situated is situated below the lowest level (in the direction of flow of the fluids) of the lateral passage sections (63) or lateral orifices of the pipes (60) in such a way that these perforated tubes (51) are immersed in a volume of liquid which feeds one or more levels of the lateral passage sections (63) of the pipes (60). The liquid is thus injected directly via the line (2) and then passes into the feed tube (50) then the tubes (51) or the slots (53).

The tubes (51) or the slots (53) are wholly immersed in the liquid volume held by the plate (62). In this way, the present invention, unlike the devices of the prior art involving pipes, permits the maintenance of a stable and horizontal gas/liquid interface. When numerous pipes intended for the distribution of fluids are arranged on a plate in order to best cover the section of the reactor, it is actually of prime importance to create a stable and horizontal gas/liquid interface in order to ensure an identical feed of fluids between the different pipes.

Generally, the distance separating the level of the tubes (51) or the top of the slots (53) from the lowest level of the lateral passage sections (63) of the pipes (60) will be greater than 50 mm and preferably between 100 mm and 300 mm.

In order that the installation of the system for the injection of the liquid limits as little as possible the number of gas/liquid injection points, the feed tube(s) (50) will generally be situated in place of one or more pipes (60), in a region next to the axis of the reactor, and the tubes (51) will be arranged along an approximately horizontal axis, between the rows of pipes (60). Eight tubes (51) can thus be arranged between the tubes (60) whether the pitch between these pipes is triangular or square.

Figure 2:
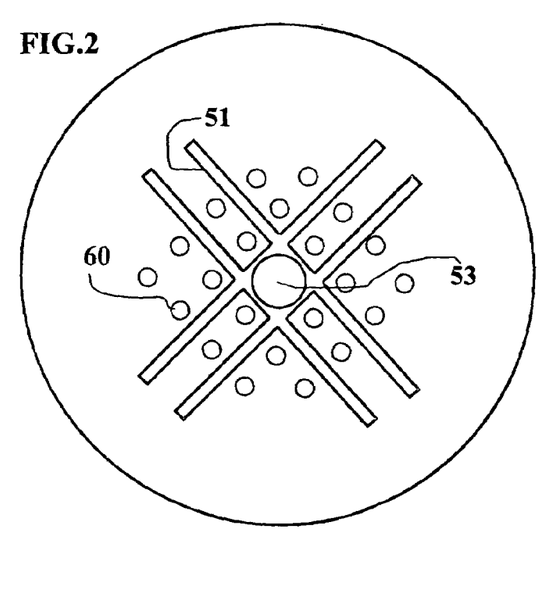

FIG. 2 shows an example of distribution of the tubes (51) in the case where the pitch between pipes (60) is triangular.

Figure 3A:
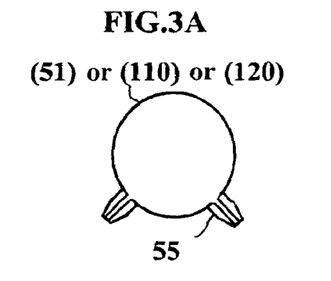
FIGS. 3A and 3B show a section through the perforated tubes.
Figure 3B:
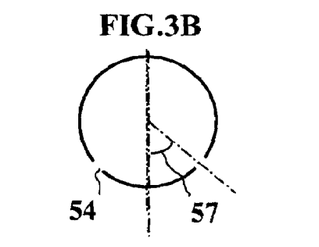

FIGS. 3A and 3B present a section through a tube (51) and describe two examples of exit section situated on these tubes. The exit sections (54) situated on the tubes (51) can be orifices (54) of various sizes, or nozzles (55) with a more or less constant and circular passage section, or with a variable passage section so as to present a convergent part followed by a divergent part.

These orifices (54) or nozzles (55) are arranged along the length of the tubes (51), more or less along a horizontal axis, and are directed generally downwards. In preferred manner, the angle ($\alpha$) between the axis of the orifices or nozzles and the vertical will be between $-90°$ and $90°$ and preferably between $-45°$ C. and $45°$, counting positively the angles situated on the right-hand half relative to the vertical axis crossing the tubes (51), and negatively the angles situated on the left-hand half relative to this same axis.

The rate of injection of the liquid will be determined in such a way that the tube (50) is always filled with liquid. The rate of injection of the liquid at the exit orifices or nozzles of the tubes (51) or slots (53) will generally be between 0.5 and 5 m/s. This speed range thus permits a range of variation of 1 to 10 in terms of liquid feed flow rate.

The gaseous charge and the liquid charge mix inside the perforated pipes (60) of which the lateral passage sections (63) situated above the interface between the liquid phase and the gas phase are used for the injection of the gas and of which the lateral passage sections situated below the interface between the gas phase and the liquid phase are used for the injection of the liquid.

It must thus be noted that the lateral passage sections (63), arranged on several levels along the pipes (60) are not specifically allocated to the passage of the liquid phase or of the vapour phase, but will be divided up naturally according to the position of the interface, into an upper group relative to this interface which will see the gas phase pass, and a lower group relative to the said interface which will see the liquid phase pass.

This interface has the property of being plane and remaining well defined over all of the envisaged range of gas and liquid flow rates, because of the characteristics of the device according to the present invention, particularly of the system for the introduction of the liquid (50). A given lateral passage section (63), and the assembly of passage sections (63) belonging to the same level, will thus see either the liquid phase or the gas phase pass, according to the respective flow rates of these phases.

It is clear that, the greater the liquid phase flow rate, the more the interface between the said liquid phase and the gas phase will be situated at a high level, but this level will however never exceed the level of the upper end of the pipes (60).

The operating principle of the device according to the present invention is to effect a pre-mixing of the liquid and gas phases in the pipes (60) before injecting this mixture at different points of the entrance to the bed by the open lower ends of the said pipes (65).

The lateral orifices (63) can vary in form, for example they can present themselves in the form of orifices, or of one or more slots. These lateral orifices are arranged on at least two different levels, preferably between 3 and 10 levels, of which at least one level, situated lowest, is used for the passage of the liquid and at least one level, situated highest, is used for the passage of the gas. The geometry of the pipes (60) thus permits a great flexibility of use of the plate in terms of variation of the liquid flow rate and the gas flow rate.

The distance between two consecutive levels of orifices or slots is greater than 20 mm and preferably at least 50 mm. The maximum width of the lateral passage section which corresponds as the cases may be to the maximum width if a slot is involved, or to the maximum diameter if an orifice is involved, will advantageously be less than 75% of the diameter of a pipe and usually greater than 2 mm. In order to ensure a good distribution of the injection points for the gas/liquid mixture resulting at the top of the catalytic bed, a certain density of pipes will be necessary. This density will generally be between 100 and 700 pipes/$m^2$ of section of bed, and preferably between 150 and 500 pipes/$m^2$. The distance (H) between the level of the passage sections that is situated lowest along the pipes (60) and the level of the tubes (51) or the level of the top of the slots (53) will generally be greater than 100 mm and preferably between 100 and 300 mm.

The effect of this distance is first to leave a sufficient volume of liquid to dissipate the kinetic energy of the jets of liquid that have come from the tubes (51) by the orifices (54) or the nozzles (55) or the slots (53), and to prevent these jets of liquid from disturbing the gas/liquid interface which must remain as far as possible parallel to the plate (62). This distance also has the effect of prolonging the residence time of the gas/liquid mixture in the pipes (60), and thus of optimizing the mass transfer between the gas and the liquid. The pipes (60) of the plate (62) thus play the part of a static mixer.

Finally the pipes (60) will advantageously be extended by a distance (h) below the support plate of the pipes (62) in order to prevent part of the liquid from spreading under the lower face of the plate (62) and reduce the space between the exit point of the mixture and the entrance into the bed. The distance (h) will preferably be between 10 and 100 mm.

Then, in order to prevent the separation of the gas/liquid mixture before its injection into the bed, the distance between the lower end of the tubes (60) and the top of the bed will preferably be between 0 and 50 mm, excluding 0, and even more preferably between 0 and 20 mm, excluding 0.

In the upper part of the granular bed and resting on it, there will generally be arranged a layer of inert spherical particles (70), called guard bed, in order to keep the distribution of the gas and liquid fluids intact as far as the catalytic bed. The thickness of this layer will generally be greater than 50 mm, preferably between 80 and 500 mm, and even more preferably between 100 and 300 mm. The diameter of the inert spherical particles used will generally be greater than 6 mm and preferably greater than 15 mm.

Figure 4:
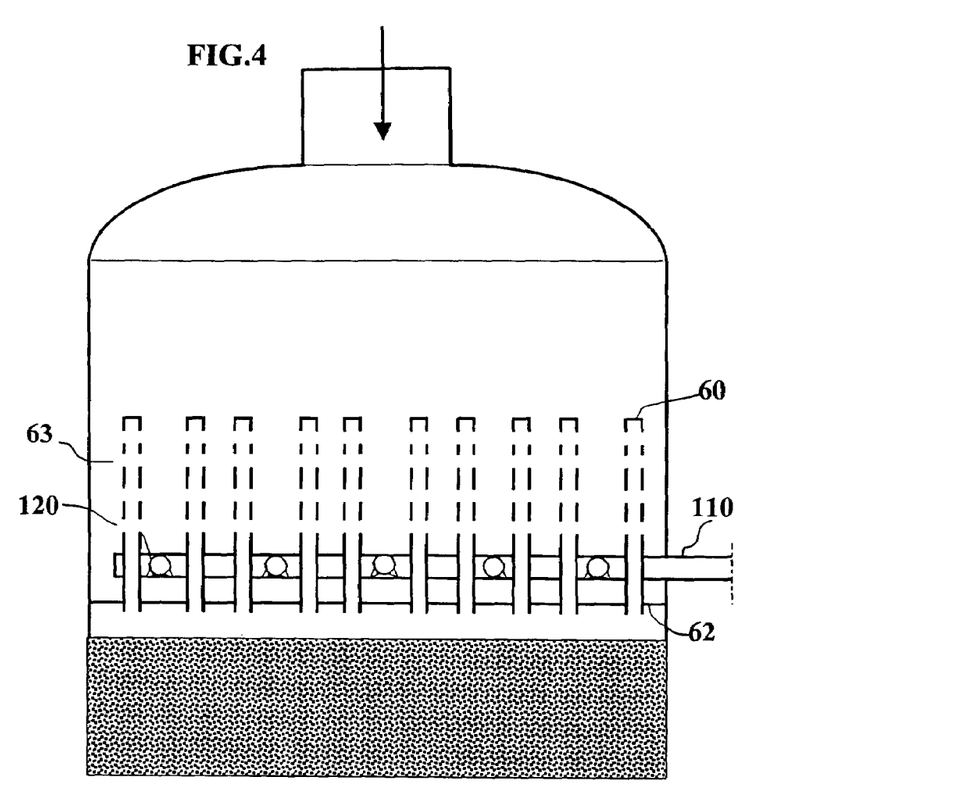
FIGS. 4 and 5 show in schematic form an embodiment of the mixing and distribution system when this is placed at the top of a reactor or between two successive granular beds, and when the fluids to be mixed can be introduced separately into the reactor.
Figure 5:
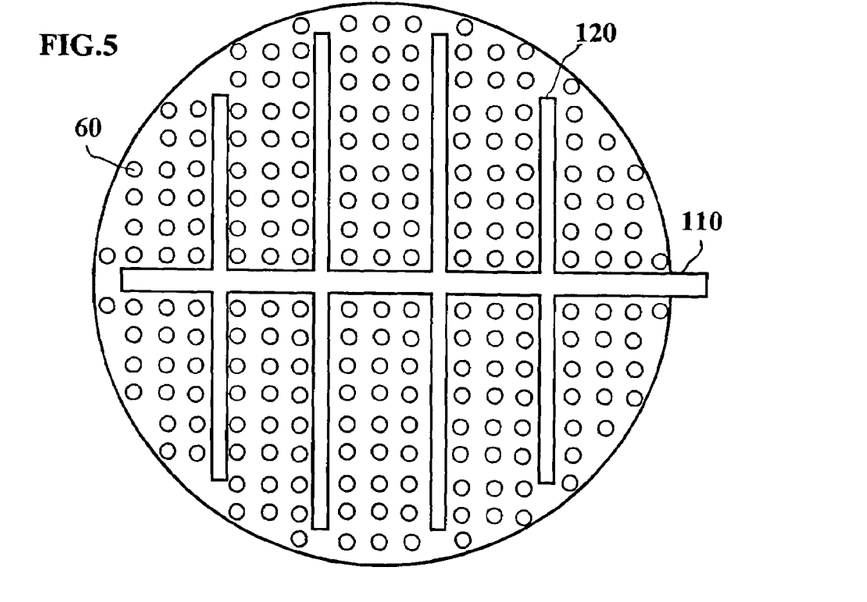

FIGS. 4 and 5 present a second embodiment of the distribution system according to the invention when it is arranged at the top of the reactor, upstream from the first bed or between two successive beds, and when at least one of the fluids to be mixed is introduced directly from outside the reactor. In this second example the primary fluid is injected along the axis of the reactor.

This fluid can be the gaseous charge when the system is situated at the top of the reactor or a gas/liquid mixture that has come from an upstream granular bed when the system is situated between two successive granular beds. The secondary fluid is itself injected by a system of perforated tubes (120) of which the principal tube (110) crosses the side wall of the reactor.

The secondary fluid can be the liquid charge when the system is situated at the top of the reactor or a liquid or gaseous effluent intended to cool the gas/liquid mixture that has come from an upper bed when the system is situated between two successive granular beds. The mixing and the distribution of the primary fluid and of the secondary fluid takes place through perforated pipes (60) arranged on a plate (62).

The characteristics of these pipes (60) are identical to those described in the first example. The tube (110), called principal tube, is arranged in a more or less horizontal manner between two rows of pipes and can be lengthened by lateral secondary tubes (120) connected to the principal tube and also extending along an axis that is more or less horizontal or simply perforated by circular, elliptical or rectangular orifices.

The secondary tubes (120) are preferably situated in the same plane as the principal tube. Generally, the distance between the level of the tubes (110) and (120) and the level situated lowest of the lateral passage sections (63) situated on the pipes (60) will be greater than 50 mm and preferably between 100 and 500 mm.

This distance allows the kinetic energy of the liquid or gaseous jets that have come from the tubes (120) to dissipate so as to not disturb the gas/liquid interface situated above the plate. Moreover when the purpose of the secondary fluid is to cool the gas/liquid mixture that has come from a granular bed situated upstream, this distance permits an increase in the contact time necessary to carry out a good thermal exchange.

FIG. 5 presents an example of configuration seen from above of the network of tubes (120) used for the injection of the secondary fluid in the case where the pitch between the pipes (60) is square. In this case, the secondary tubes (120) are arranged more or less orthogonally relative to the principal tube (110). The characteristics of the exit sections of the secondary tubes (120) are the same as those described in FIG. 3.

The exit sections of the tubes (120) or (110) can be orifices (54) of various shapes or nozzles (55) the passage section of which can be approximately constant and circular or variable so as to present a convergent part followed by a divergent part.

These orifices or nozzles will generally be directed downwards, and the angle (57) between the axis of the orifice and the vertical will be between −90° and 90°, and preferably between −45° and 45°. When the secondary fluid is liquid, the rate of injection of the liquid at the orifices (54) or the nozzles (55) will be between 0.5 and 3 m/s. When the secondary fluid is gaseous, the rate of injection at the level of the orifices (54) or the nozzles (55) will advantageously be between 0.5 and 5 m/s. This speed range thus permits a range of variation of 1 to 10 in terms of gas feed rate.

Figure 6:
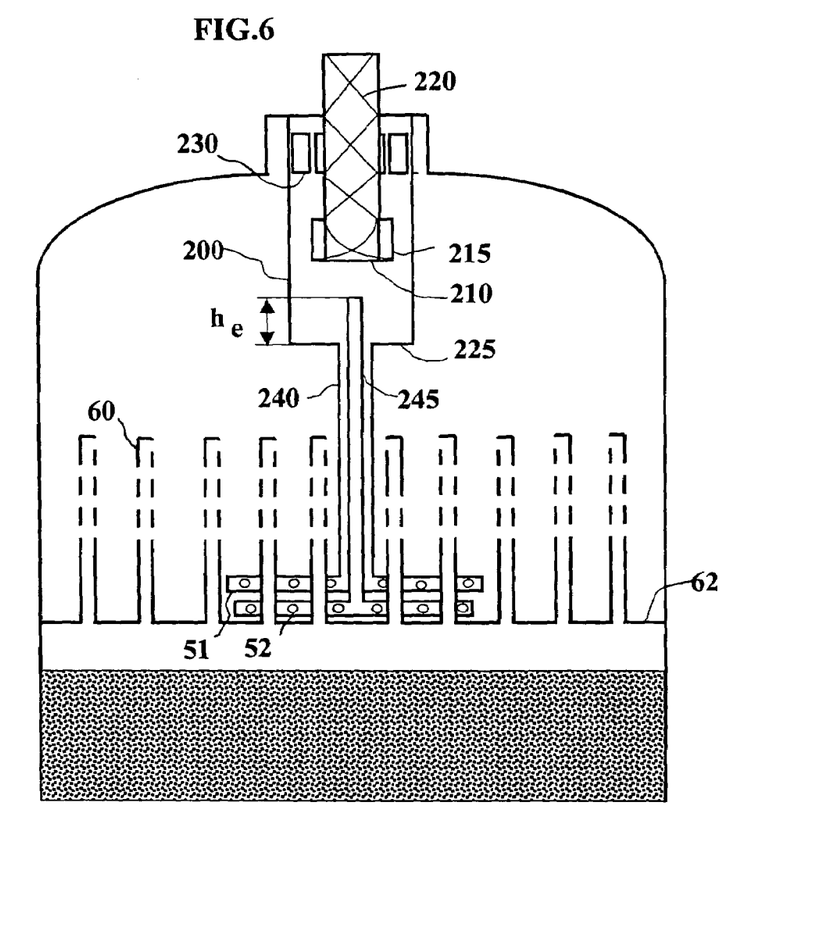
FIG. 6 presents an embodiment of the mixing and distribution system preferably placed upstream from a first granular bed, when the fluids to be brought into contact are introduced into the reactor in a mixture.

FIG. 6 presents a third embodiment of the distribution device according to the invention when it is arranged at the top of the reactor, and when the fluids to be mixed and distributed are introduced in a mixture, which will also be called in mixed phase, into the reactor. When it is not possible to inject separately into the reactor the fluids to be distributed, these fluids are in fact generally introduced in the form of a downward two-phase co-current flow.

In this case, the distribution system is still constituted by a plate with pipes (60) having lateral passage sections (63) for the feed of the two fluids, but it is preceded by a separation system (200) permitting the separation of the two fluids upstream from the plate (62). The introduction of the gaseous fluid resulting from this separation at the top of the reactor is by means of lateral exit windows (230), and the introduction of the liquid fluid resulting from the said separation at the plate (62) is by a system of concentric tubes (240) and (245) which feed the network of tubes (51) in the same conditions as in the case described previously.

The characteristics of the pipes (60) are identical to those described in the first example. The separation system (200) is constituted by a central cylindrical tube (210) ending in at least one tangential exit (215) for the liquid and by at least one tangential exit for the gas (230), imposing on the flow a rotation of at least 90° relative to the axis of the tube.

This system, already described in patent FR 2 798 864, permits a rapid separation of a gas/liquid mixture of which the ratio of the mass flow rates of the gas to the liquid is between 0.1 and 10. The number of tangential exits for the gas and for the liquid is between 1 and 4, preferably equal to two for each phase. By way of example, the ratio of the opening sections of each tangential exit to the passage section of the tube (210) is between 0.25 and 1, and preferably between 0.4 and 0.6.

The ratio between the height and the width of the tangential exit (215) is generally between 1 and 4, preferably more or less equal to 2. Inside the tube (210) and upstream from the tangential exits (215) a screw (220) can be added. This screw (220) can be of the single-revolution or double-revolution type. The ratio of the width of the screw, corresponding to the passage section of the fluids, to the diameter of the tube can be between 0.5 and 1.

The pitch number of the screw (i.e. the ratio of the total height of the screw to the pitch of the screw) is generally between 1 and 6, and preferably between 2 and 3.

The fluids that have come from the tube (210) are recovered in a chamber (225) the diameter of which is greater than double the diameter of the tube (210) and less than 90% of the diameter of the reactor. The purpose of this chamber is to dampen the flow rate fluctuations of the liquid to be injected at the plate (62).

The gas is evacuated from the chamber (225) through the tangential exit sections (230). These exit sections can be constituted for example by orifices that are circular or elliptical in shape, or by slots of rectangular shape. The ratio of the total area of the exit sections (230), that is to say the sum of the areas of the sections (230) divided by the section of the tube (210) will be between 0.5 and 4, preferably more or less equal to 2.

The distance (p) separating the exit sections (230) from the exit sections (215) will generally be at least equal to 50 mm and in particular between 100 and 300 mm. The liquid is evacuated from the chamber (225) with the help of at least one tube (240) the upper end of which is connected to the bottom of the chamber (225) and the lower end of which is connected to at least one horizontal perforated tube (51).

The exit sections of the tubes (51) can be orifices (54) of various sizes or nozzles (55) the passage section of which can be approximately constant and circular or variable, so as to present a convergent part followed by a divergent part. These orifices (54) or nozzles (55) will generally be directed downwards, and the angle (57) between the axis of the orifice and the vertical will in preferred manner be between −90° and 90°, and preferably between −45° and 45°. The diameter of the orifices (54) or of the nozzles (55) will be calculated so as to keep the tube (240) filled with liquid, or more generally with dense fluid over all of the flow rate range of this fluid. The flow rate variation range will thus correspond to the variation in the height of the level of the dense fluid in the chamber (225).

This level will still be lower than the distance separating the bottom of the tube (210) from the bottom of the chamber (225). To increase the dense fluid flow rate range, a second evacuation tube for the chamber (225) can be added. This second tube (245), generally concentric and situated inside the tube (240), discharges into the chamber (225) at its upper end which acts an entry orifice for the dense fluid.

This upper end of the tube (245) is situated at a distance $h_\theta$ from the bottom of the chamber (225) in such a way that this second tube (245) is used only when the dense fluid flow rate corresponds to a dense fluid level in the chamber (225) greater than the distance $h_\theta$. This tube (245) is also connected at its lower part to at least one perforated tube (52) of the same type as the perforated tubes (51). This tube (245) can be concentric to the tube (240) as is represented in FIG. 5 or independent of the tube (240).

The characteristics of the tubes (52) are the same as those of the tubes (51). The passage diameter of the exit orifices or nozzles of the tubes (52) is calculated so that the dense fluid level in the chamber (225) at the maximum flow rate of this dense fluid never exceeds the distance between the bottom of the chamber (225) and the lower end of the tube (210).

The entire disclosure of all applications, patents and publications, cited herein and of corresponding French application No. 0209076 filed Jul. 16, 2002 is incorporated by reference herein.

The following example illustrates the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

Comparatibe Example Between a Plate According to the State of the Art and a Plate According to the Invention A comparative test was carried out between a standard system comprised of a plate with perforated pipes, fed by a co-current gas/liquid flow and a system, as described in FIG. 4, comprising a plate with perforated pipes, fed with liquid by a radial tube. The two systems were tested on a reactor 400 mm in diameter.

The reference distribution system, or that according to the prior art, is comprised of a plate on which are fixed 55 pipes with a diameter of 15 mm. The pipes are perforated by 20 circular orifices 7 mm in diameter arranged in tiers on 10 levels between 50 and 250 mm relative to the level of the plate. During the comparative tests carried out, the distribution system was fed directly by a descending co-current gas/liquid flow introduced more or less along the direction of the vertical axis, at the top of the reactor.

The distribution system as described in the present application is comprised of a plate on which are fixed 55 pipes (60) with a diameter of 15 mm. The pipes (60) are perforated by 16 circular orifices 7 mm in diameter situated on 8 levels arranged in tiers between 90 and 250 mm relative to the level of the plate. The liquid is introduced with the help of a tube (110) crossing the lateral wall of the reactor following the geometry described in FIG. 4. This tube is perforated by 68 orifices 7 mm in diameter arranged in approximately equally distributed manner, at the following angles (57), relative to the vertical, of: −45°, −30°, 30° and 45°. For the test presented, the liquid speed at these orifices is equal to 3.8 m/s. The distance between the level of the orifices of the tube (110) and the lowest level of the orifices of the pipes is 50 mm.

Figure 7A:
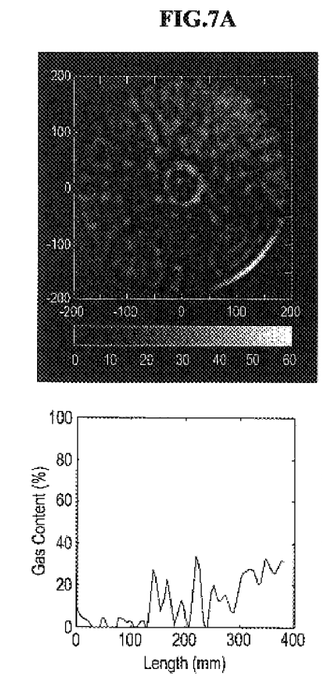
FIGS. 7a; 7b; 7c are visualisations of the distribution of the dense liquid over a section of the reactor obtained by gamma tomography without the tubular system for the introduction of the liquid, for different gas flow rates.
Figure 7B:
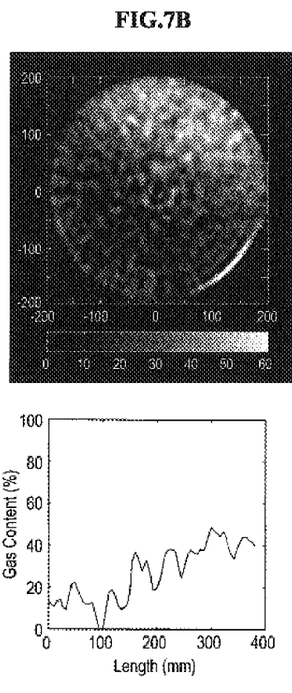
Figure 7C:
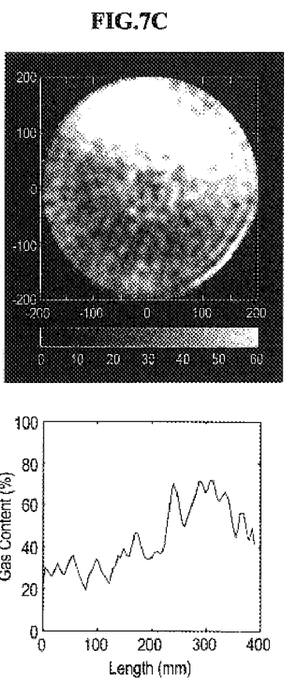
Figure 8A:
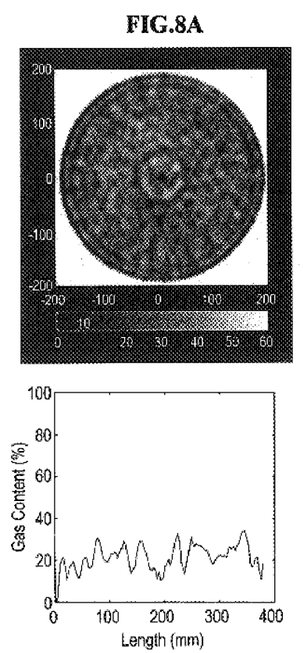
FIGS. 8a; 8b; 8c are visualisations of the distribution of the dense liquid over a section of the reactor obtained by gamma tomography with the tubular system for the introduction of the liquid, for the same gas flow rates as in the case of FIGS. 7a; 7b; 7c.
Figure 8B:
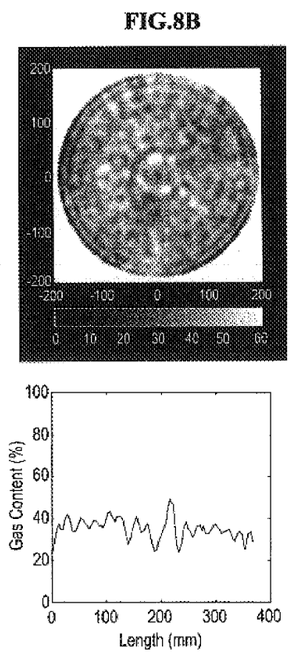
Figure 8C:
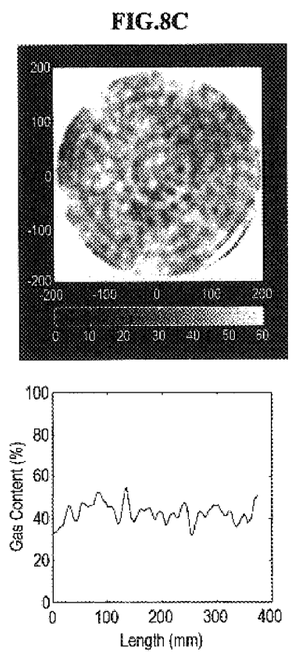

FIG. 7 presents a comparison of the distribution of the gas content measured in the catalytic bed with the help of a gamma ray tomograph situated at a distance of 500 mm from the bottom of the pipes (60). FIGS. 7 and 8 present the picture of the gas content measured respectively when the standard distribution system is used and when the system described according to the invention is introduced. The colour scale ranges from black for a gas content of zero (liquid flow only) to white for a gas content of 60%. The liquid flow rate relative to the empty section of the reactor is 56 kg/m²/h, and the gas flow rate is 0.2 kg/m²/h (FIGS. 7a and 8a), 0.5 kg/m²/h (FIGS. 7b and 8b) and 1 kg/m²/h (FIGS. 7c and 8c).

As can be seen, in the absence of a system for the introduction of the liquid, the distribution of the gas over the section of the bed is clearly degraded inasmuch as the FIG. 7 show levels of grey that are less uniform than those of FIG. 8. As the profiles obtained on a diameter of the reactor show, the gas content is in fact not at all homogeneous over all of the section.

The liquid level is actually unbalanced at the plate and the pipes are not all fed in the same way. In contrast, the system as described according to the invention allows a homogeneous distribution of the gas to be obtained over all of the section of the bed. The gas content profiles obtained on a diameter of reactors are all very horizontal. The effectiveness of the distribution system remains excellent when the gas content by volume in the gas/liquid mixture varies from 20 to 50%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Device for mixing and distributing a dense, generally liquid, fluid and a light, generally gaseous, fluid, placed in a reaction chamber upstream from a granular bed or between two successive granular beds, the said device comprising:
   a more or less horizontal plate (62) in the reaction chamber, covering all of the cross-section of the reaction chamber and supporting,
   a multiplicity of substantially vertical pipes (60) which pipes include an upper end communicating with the part of the reaction chamber situated above the plate (62), a lower end communicating with the part of the reaction chamber situated below the plate (62), the said pipes being pierced, in the upper end and extending to a lowest level which is above the level of the plate, by lateral orifices (63) permitting the introduction of the dense fluid and of some of the light fluid inside the said pipes (60),
   a tubular system (50) extending downwardly from above the vertical pipes into the reaction chamber for the introduction of the dense fluid from outside the reaction chamber into a volume surmounting the horizontal plate (62), which volume is above the plate and below the lowest level of said lateral orifices (63), the tubular system having exit slots for the dense fluid that are wholly immersed in the said volume surmounting the plate (62), and means for introducing said light fluid into the reaction chamber above the level of the plate (62).

2. Mixing and distribution device according to claim 1 in which the tubular system is situated at a level next to the level of the plate.

3. Device according to claim 1 in which the density of the number of vertical pipes is between 100 and 700 per m$^2$ of reactor cross-section.

4. Device according to claim 1 in which the lateral orifices (63) are distributed along the pipes (60) on two or more levels, the lowest level being situated at a distance of between 100 and 300 mm above the level of the exit slots of the tubular system (50).

5. Device according to claim 1 in which the pipes (60) are extended by a distance h below the level of the plate (62), this distance h being between 10 and 100 mm.

6. Device according to claim 1 in which the distance (d) separating the lower end of the pipes (60) from the upper level of the granular bed downstream therefrom is between 0 and 50 mm, excluding 0.

7. Device according to claim 1 in which the tubular system (50) comprises a more or less vertical principal tube extending downward into the volume surmounting the plate (62) and a multiplicity of more or less horizontal secondary tubes (51) in communication with the principal tube fitted with exit orifices (54) within the volume surmounting the plate (62).

8. Device according to claim 7 in which the exit orifices (54) of the secondary tubes (51) are directed downwards forming an angle relative to the vertical which is between −90 and +90°.

9. Device according to claim 7 in which the exit orifices (54) of the secondary tubes (51) have the form of a nozzle with a more or less constant section.

10. Device according to claim 7 in which the exit orifices (54) of the secondary tubes (51) have the form of a nozzle with a variable section so as to present, in the direction of flow of the liquid, a convergent part followed by a divergent part.

11. Device according to claim 7 in which the exit orifices (54) of the secondary tubes (51) are directed downwards forming an angle relative to the vertical which is between −45° and +45°.

12. The method according to claim 7, wherein the exit orifices (54) within the volume surmounting the plate (62) on the horizontal secondary tubes (51) are uniformly distributed over the horizontal cross-section of the reaction chamber.

13. Device according to claim 1 in which the tubular system (50) comprises a more or less vertical tube extending downward into the volume surmounting the plate (62) fitted at its lower end with lateral slots (53) situated at a distance, relative to the lowest level of the lateral orifices (63) of the pipes (60), of between 100 mm and 500 mm.

14. Device according to claim 1 in which the lateral orifices (63) of the pipes (60) are distributed over at least two vertical levels, the said levels being vertically spaced at least 20 mm apart from each other.

15. Device according to claim 1 in which the maximum width of the lateral orifices (63), or their diameter when they are circular, is less than 75% of the diameter of the pipes (60) and greater than 2 mm.

16. Device according to claim 1 in which there is added at the top of the reactor a system (200) for separating the gas and liquid phases when the fluids to be distributed are introduced in a mixture, the said separation system comprising a cylindrical tube (210) with internal fittings permitting a rotation and a separation of the said mixture.

17. Device according to claim 16 in which the separation system (200) has from 1 to 4 tangential exits for the liquid phase (215) and for the gas phase (230), the ratio of the total area of the exit sections of the gas (230), that is to say the sum of the areas of the sections (230) divided by the area of the section of the tube (210) being between 0.5 and 4 times the passage section of the cylindrical tube (210).

18. Device according to claim 17, wherein the sum of the areas of the sections (230) divided by the area of the section of the tube (210) is approximately 2 times the passage section of the cylindrical tube (210).

19. Device according to claim 16 in which the tangential exits (215) for the liquid and (230) for the gas of the separation system (200) are spaced at a distance (p) greater than 50 mm.

20. Device according to claim 16 in which the cylindrical tube (210) of the separation system (200) contains a screw the pitch number of which is between 1 and 6.

21. Device according to claim 16 in which the tangential exits (215) for the liquid and (230) for the gas of the separation system (200) are spaced at a distance (p) between 100 mm and 300 mm.

22. A hydrotreatment process for hydrocarbons which includes a step for mixing and distributing a dense, generally liquid, fluid and a light, generally gaseous, fluid, placed in a reaction chamber upstream from a granular bed or between two successive granular beds, using a device according to claim 1.

23. A method for mixing and distributing a dense, generally liciuid, fluid and a light, generally gaseous, fluid in a descending gas and liquid co-current reactor, upstream from a granular bed or between two successive granular beds, using a device according to claim 1, and in which the volume ratio of gas to liquid is between 0 and 400, excluding 0.

24. The method according to claim 23 wherein the liquid flux being is between 0.5 and 100 kg/m$^2$/second.

25. The method according to claim 23 wherein the liquid flux is between 10 and 80 kg/m$^2$/second.

26. Device according to claim 1 in which the density of the number of vertical pipes is between 150 and 500 per m$^2$ of reactor cross-section.

27. Device according to claim 1 in which the distance (d) separating the lower end of the pipes (60) from the upper level of the granular bed downstream therefrom is between 0 and 20 mm, excluding 0.

* * * * *

UNITED STATES PATENT AND TRADEMARK OFFICE
CERTIFICATE OF CORRECTION

PATENT NO. : 7,250,142 B2 Page 1 of 1
APPLICATION NO. : 10/619557
DATED : July 31, 2007
INVENTOR(S) : Christophe Boyer et al.

It is certified that error appears in the above-identified patent and that said Letters Patent is hereby corrected as shown below:

Column 14, line 42, reads "liciuid, fluid" should read -- liquid, fluid --
Column 14, line 49, reads "flux being is between" should read -- flux is between --

Signed and Sealed this

Eighteenth Day of December, 2007

JON W. DUDAS
*Director of the United States Patent and Trademark Office*